Dec. 30, 1969   D. VOLK   3,486,812
APPARATUS FOR MEASURING THE ECCENTRICITY
OF AN APPROXIMATELY CONICOID SURFACE
Filed Sept. 14, 1966   6 Sheets-Sheet 1

FIG. 1

INVENTOR
DAVID VOLK
BY
Baldwin, Doran & Egan
ATTORNEYS

Dec. 30, 1969   D. VOLK   3,486,812
APPARATUS FOR MEASURING THE ECCENTRICITY
OF AN APPROXIMATELY CONICOID SURFACE
Filed Sept. 14, 1966   6 Sheets-Sheet 6

INVENTOR
DAVID VOLK
BY
Baldwin, Doran & Egan
ATTORNEYS

United States Patent Office 3,486,812
Patented Dec. 30, 1969

3,486,812
APPARATUS FOR MEASURING THE ECCENTRICITY OF AN APPROXIMATELY CONICOID SURFACE
David Volk, 3336 Kersdale Road,
Pepper Pike, Ohio 44124
Continuation-in-part of application Ser. No. 496,788, Oct. 18, 1965. This application Sept. 14, 1966, Ser. No. 579,276
Int. Cl. A61b 3/10
U.S. Cl. 351—6        4 Claims

ABSTRACT OF THE DISCLOSURE

Apparatus is disclosed for measuring the slope of a corneal surface at a point thereon spaced from its optical axis by determining the normal to the surface at that point by swinging an observing telescope a known angle about a known pivot point until light reflected along the optical axis of the telescope toward the cornea is reflected back on, or a small measured amount away from, exact coincidence with the said optical axis of the telescope.

---

This application is a continuation-in-part of my pending application Ser. No. 496,788, filed Oct. 18, 1965 for Method for Cornea Measurement and now abandoned.

This invention relates to a method and apparatus for determining, on optical surfaces, the eccentricity of conicoids of revolution, including spheres, and including related surfaces not of revolution having two principal directions, such as ellipsoids not of revolution, elliptic paraboloids and related surfaces, in which the principal sections are conics. The method and apparatus can also be used for determining whether optical surfaces do in fact have a constant eccentricity in the principal sections, or depart from it. A spherical optical surface, which is a conicoid of revolution of zero eccentricity, can be tested for its accuracy of contour by the same method and apparatus, and along the principal sections of toric surfaces, the circular profiles may likewise be tested for the accuracy of, or departure from, circularity.

A particularly useful application of the method and apparatus of this invention is in the measuring of the anterior surface of a human cornea and relating the information obtained to a conicoid of revolution which, as the negative or corneal surface of a contact lens, closely approaches the shape of the cornea measured.

The following description relates to measurements of the human cornea, but the description applies to other optical surfaces such as have already been mentioned.

It is known that the anterior surface of the human cornea is generally of conicoid shape. Contact lenses whose surfaces are conicoids of revolution, disclosed in my copending application, Aspheric Corneal Contact Lens Series, Ser. No. 492,408, filed Oct. 4, 1965, can now be produced with extreme accuracy as to apical radius of curvature and eccentricity by methods and apparatus disclosed in my copending application Method and Apparatus for Producing Aspheric Contact Lenses, Ser. No. 492,217, filed Oct. 1, 1965, Lens Generating Method, Patent No. 3,218,765, granted Nov. 23, 1965, and Lens Generating Apparatus, Ser. No. 480,726, filed Aug. 18, 1965. In order to apply such contact lenses to the human cornea in a satisfactory manner, it is necessary to be able to measure not only the apical radii of curvature but to determine simply and with accuracy the eccentricity or average eccentricity of one or more principal directions of the cornea.

Present instruments such as the ophthalmometer or keratometer can be used in the measurement of the radius of curvature of the corneal apex in one or more principal directions with a high degree of accuracy. Such instruments determine the radius of curvature of the corneal apex, where meridian sections are substantially circular by measurements of the size of a reflected corneal image of an illuminated object of known or adjustable size, at a fixed distance from the corneal image. In other words, object-image size ratio, or magnification, is fundamental to keratometry. Since the cornea is not spherical, but changes continuously and regularly in curvature away from the apex, magnification is not constant, but changes continuously and progressively from the corneal apex to the periphery. If one attempts to use kerotometry for measurements away from the corneal apex, the relatively large corneal image of the relatively large test object is non-uniformly magnified in each of two directions, so that the fundamental principle of keratometry, for each direction, is violated. Hence, information on the periphery of the cornea obtained by keratometry is difficult to relate to eccentricity, or approximate eccentricity, of the cornea.

In the method of this invention, eccentricity or approximae eccentricity is determined by a direction measurement, which is fundamental, rather than a size or magnification measurement, so that the inherent defect of keratometry for periphery measurements is obviated.

In the drawings,

FIG. 8 is an enlarged view of the reticle for use in the telescope of FIG. 4 for the second embodiment of this invention; while

For the first and second embodiments of this invention, the determination of eccentricity of either a positive or negative optical surface by the method of this invention, hereinafter termed eccentrometry, is explained by referring to FIG. 1 and the following discussion.

Figure 1:
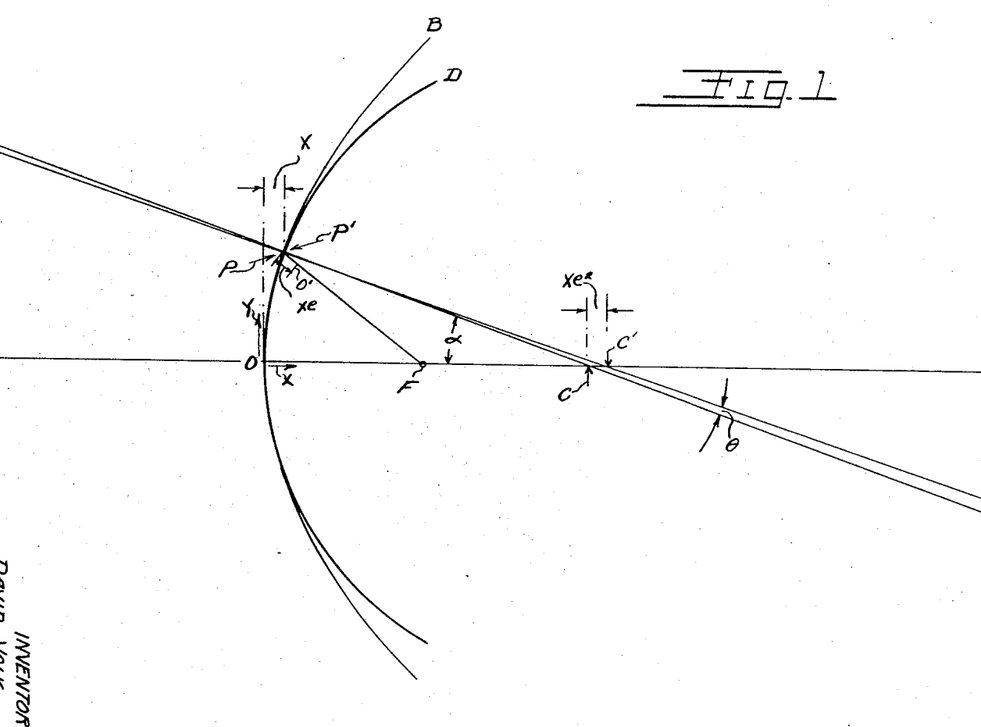
FIG. 1 is a diagrammatic illustration of a parabolic meridian section of a lens or mirror surface or cornea, osculated at the apex by a portion of a circle having the same radius of curvature as said apex, and illustrating the determination of the angles $\alpha$ and $\theta$ utilized in one embodiment of the method of this invention.

In FIG. 1, along Cartesian coordinates, designated $x$ and $y$, I have drawn a conic, OB, which specifically is a parabola, with its apex at O, O being the origin of the coordinates, the focus at F, and the center of curvature of the apex at C. FO' equals FO and $\Delta xe/\Delta x$ equals 1.0, which is the eccentricity $e$ for a parabola.

The apical radius of curvature of the conic is given by the equation:

$$r = f_{\text{axial}}(1+e) \tag{1}$$

where $e$ is the eccentricity of the conic and $f_{\text{axial}}$ is the axial focal radius. For any point $P(x,y)$ along a conic, an incremental change, $\Delta x$, in the value of $x$ results in an incremental change, $\Delta f$, in the value of the focal radius to the new point P according to the equation:

$$e = \Delta f / \Delta x \tag{2}$$

Since for any particular conic, $e$ is constant, Equation 2 holds for all magnitudes of $\Delta f$ and $\Delta x$. Hence $OX = x$, as measured along the abscissa, with point O as origin, can be considered the increment $\Delta x$; and $xe$ is the increment $\Delta f$ by which the axial focal radius is increased from FO, at the apex, to the focal radius FP where point P on the conic is at the vertex depth $x$. From point P, a normal to the conic at said point extends through point C' on the axis of the conic, where the length of the increment CC' is $xe^2$.

In FIG. 1, I have also drawn circular arc, OD, which osculates the parabola at its vertex, O, with the center of said circular arc at point C on the axis of the conic. Intersecting circular arc OD at point P', is PC', the normal to the conic at P. From point C, I have drawn a radius to point P', forming an angle $\alpha$ with the axis of the conic. Angle CP'C', which is the angle formed by the normal to the circular arc and the normal to the conic arc at point P', is $\theta$, where $\theta$ is a function of both eccentricity of the conic and $\alpha$.

From the geometry of FIG. 1, as described, it can be shown that for a given value of $\alpha$, where $\alpha$ is a relatively small value, but which is sufficient for measurement of the human cornea, eccentricity $e$ is obtained, to a close approximation, by means of the following equation:

$$e = \left( \frac{\sin \theta}{[\sin (\alpha - \theta)](1 - \cos \alpha)} \right)^{1/2} \tag{3}$$

which may be considered a working eccentrometric equation embodying the principles of direction measurement for the determination of eccentricity by the method of the first embodiment of this invention. As an example of the use of Equation 3 and the degree of accuracy obtained with it, consider the parabola of FIG. 1. If $\alpha = 19.835°$, then $\theta$ will be $1.065°$, which values applied to Equation 3 yield a value of eccentricity of 0.987 rather than the exact value of 1.000. The values obtained by Equation 3 are satisfactory for fitting contact lenses. The slight difference in eccentricity obtained by Equation 3 from the exact value depends upon the fact the points P and P' do not coincide, although they are so close they cannot be shown as separate in FIG. 1. For instance, in the parabola used as the example above, if the apical radius of curvature is 8.0 mm., the coordinates of the point P are $x = .4620$ mm. and $y = 2.7188$ mm. and the coordinates of the point P' are $x = .4746$ mm. and $y = 2.7145$ mm.

In the clinical application of fitting contact lenses to the human cornea, an exact value of eccentricity is not required since the cornea is only approximately of conicoid shape. Furthermore a tolerance in the fit of the lens to the cornea is present. Also, there are limits in the accuracy with which the measurements of the cornea can be made, based upon estimates of end points in measuring technique, slight motions of the patient's eye during the measurement, etc. However, if one desires a high degree of accuracy in the value of eccentricity, the small discrepancy between the value calculated by Equation 3 and the exact value of a conicoid can be corrected by a more precise calculation in which the source of the discrepancy, i.e., the non-coincidence of points P and P' is taken into account.

Figure 2:
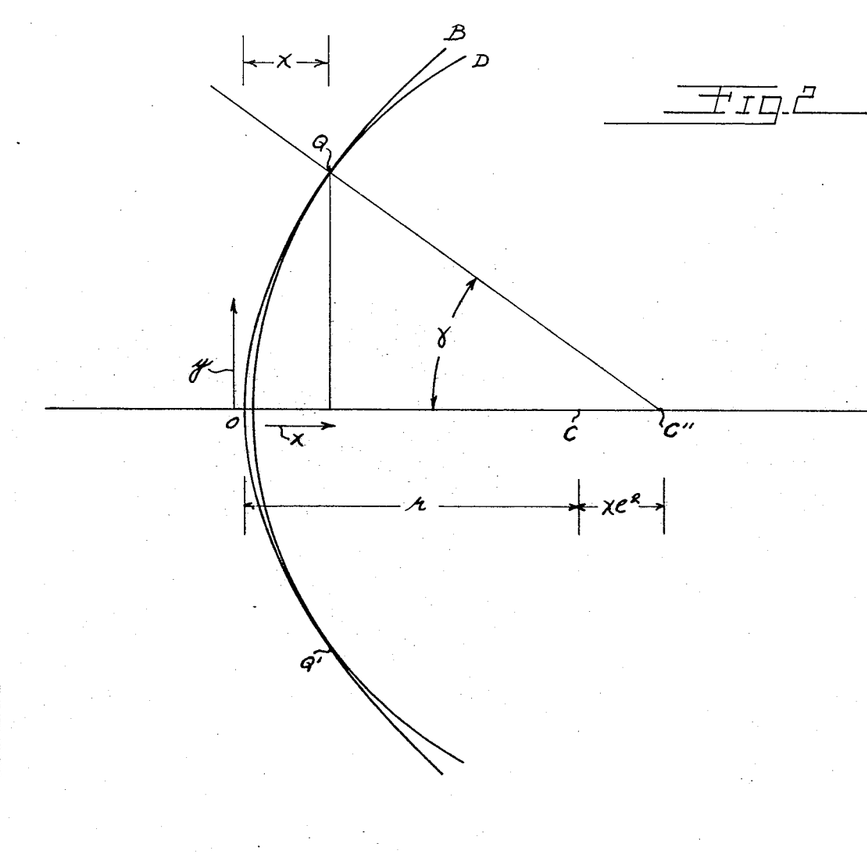
FIG. 2 is a diagrammatic illustration of a parabolic meridian section of a lens or mirror surface or cornea, osculated by a circle at points equidistant from the apex, and illustrating the determination of angle $\gamma$ used in another embodiment of the method of this invention.

Another embodiment of the method of this invention, in which direction measurement is fundamental, is shown in FIG. 2, where I have drawn a parabola identical to that of FIG. 1. I have also drawn circular arc OD which osculates the parabola at points Q and Q', with the center of said circular arc at point C'' on the axis of the conic. From point C'' I have drawn a radius to point Q, which is the common normal to said conic and said circular arc at their point of tangency. Angle $\gamma$, between said radius and the axis of the conic, is a function of the apical radius of curvature of the conic, the eccentricity of the conic, and the distance $xe^2$ between the center of curvature of the apex of said conic, C, and the center of curvature of said osculating circle, C''.

From the geometry of FIG. 2, it can be shown that for the prolate ellipsoid, the paraboloid, and the hyperboloid, the apical radius of curvature, $r$, the vertex depth, $x$, of point Q, and the distance $y$, of the said point Q from the axis of the conic, of eccentricity, $e$, are related by the following equation:

$$(1 - e^2)x^2 - 2rx + y^2 = 0 \tag{4}$$

It can also be shown that angle $\gamma$ is obtained by the following equation:

$$\gamma = \tan^{-1} \frac{y}{r - (1 - e^2)x} \tag{5}$$

curvature and for a series of values of $x$, one may calculate by means of Equation 4 a series of values of $y$, For a conic of a given eccentricity and apical radius of and by means of Equation 5, the values of $\gamma$ corresponding to the series of values of $x$. Since for each value of $x$, the distance of point C'' from C is obtained by the relationship, $CC'' = xe^2$, one can then relate, for said parabola, the distance CC'' between the center of curvature of the apex of the conic and point C'', and the angle $\gamma$. Since a conic of a given eccentricity differs from any other conic of the same eccentricity only in magnitude, it is therefore possible to relate $\gamma$ to the ratio of $xe^2/r$. A graph of $xe^2/r$ versus $\gamma$ may be drawn, or a series of values of $xe^2/r$ and corresponding values of $\gamma$ may be set up in tabular form. As an example, if for the parabola, $xe^2/r$ is 0.1, then $\gamma = 26.565°$, and if $xe^2/r$ is 0.2, then $\gamma = 35.263°$. Values of $xe^2/r$, ranging from 0.00 to about 0.30 will generally suffice for the determination of eccentricity by this invention.

Figure 6:
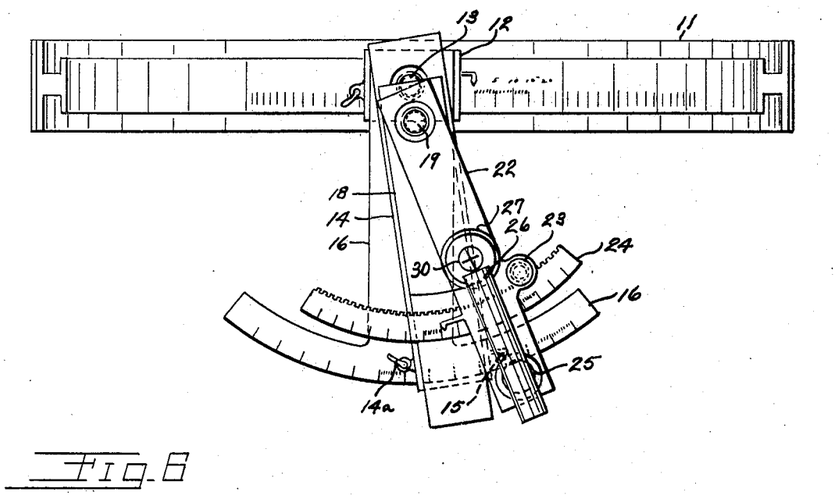
FIG. 6 is a view similar to FIG. 5 showing another position of two superimposed arms swung about their respective pivots.

Identical calculations can be performed for ellipses and hyperbolas for eccentricities ranging from about .4 to about 1.6, in steps of .1. These values represent the eccentricities to be used in the design of contact lenses. Graphs and tables of such data are required for this embodiment of the invention, based upon the geometry of FIG. 2 and the use of which is illustrated in FIG. 6. For a given ratio of $xe^2/r$ a table may be set up, for example, in which eccentricity $e$ is related to $\gamma$. With a sufficient number of tables, $e$ can be obtained directly from $\gamma$, for one or more specified ratios of $xe^2/r$.

Based upon the principles outlined, the eccentrometer can be made in three forms, each of which employs the measurement of direction.

Figure 3:
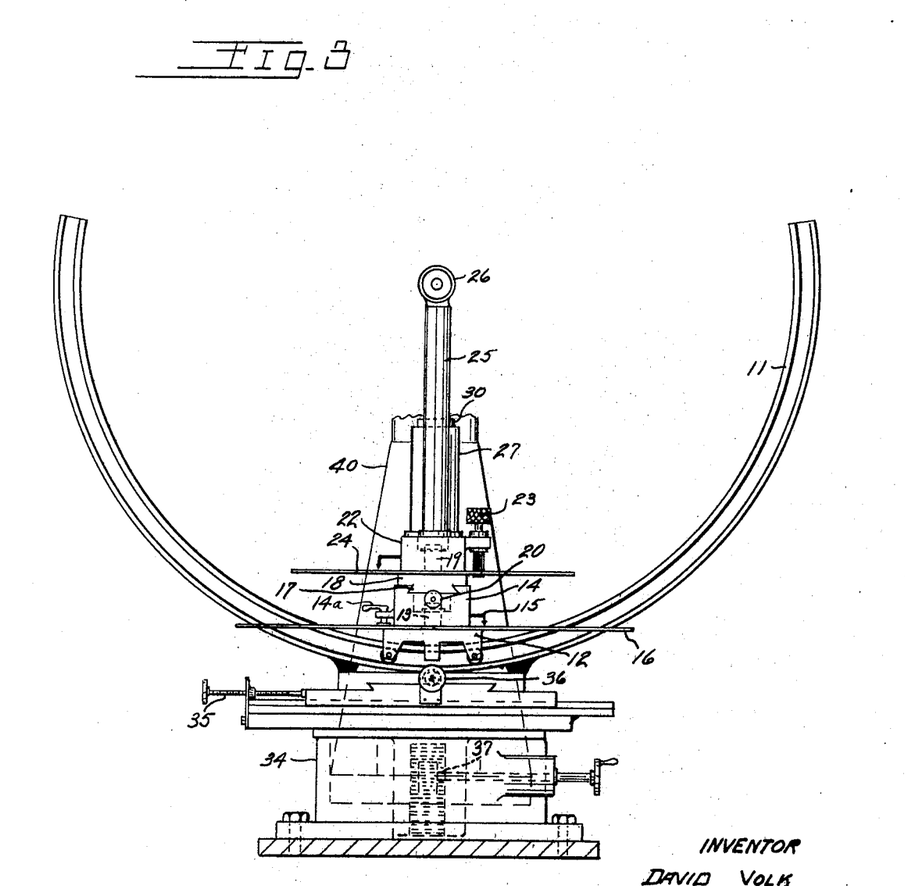
FIG. 3 is a front elevational view of a form of apparatus useful in cornea measurement according to this invention.
Figures 4, 9:
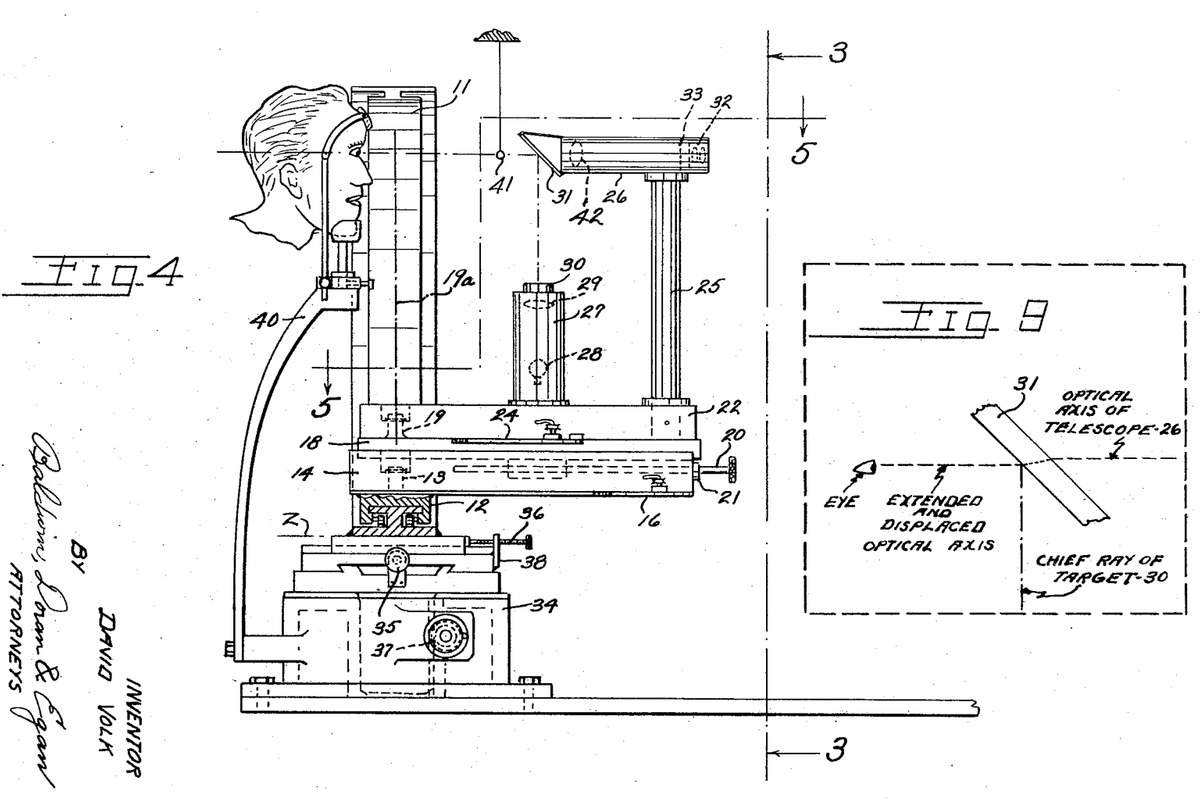
FIG. 4 is a side elevational view of the device of FIG. 3 taken from the left-hand side of that figure and with the additional showing of a chin and head rest for the patient to be examined.
FIG. 9 is an enlarged view of reflecting glass 31 of FIG. 4 intersected on one side by the optical axis of the telescope, and on the other side by the displaced extension of the optical axis through said reflecting glass.

FIG. 3 is a front view and FIG. 4 is a side view of a first embodiment of the apparatus. Circular track 11 has on it carrier 12 which slides, or rolls on wheels, along a groove in 11 to any predetermined position where it is locked at a 12a position. This position is read on scale 12b. Attached to carrier 12 by means of a cylindrical pivot 13, whose axis passes through the axis of symmetry of circular track 11, is arm 14 which may be made to rotate perpendicular to the axis of pivot 13. Pointer 15 on arm 14 moves along circular scale 16 where the angular rotation of arm 14 with respect to the plane of circular track 11 can be noted. This is the angle $\alpha$ referred to herein. On the upper surface of arm 14 are parallel ways 17 extending longitudinally of arm 14. Slidably attached to the said ways is a slide 18 which has a cylindrical pivot 19 whose axis is perpendicular to the plane of said ways. By means of screw 20, carried by arm 14 and threaded in a projection of slide 18, the slide may be adjusted longitudinally relative to arm 14. The axis of pivot 19 can be set coaxial with the axis of pivot 13, or moved otherwise as hereinafter explained. At the free end of threaded screw 20 is a calibrated circular scale 21 by means of which a controlled displacement of the axis of pivot 19 can be obtained with respect to the axis of pivot 13. An arm 22 is bored to fit snugly and rotate about pivot 19, and can be rotated perpendicular to the axis of pivot 19. The amount of rotation of arm 22 is controlled by screw 23 and read off on scale 24.

From arm 22, extending in a direction parallel to the axis of pivots 13 and 19, is post 25, and telescope 26 is attached rigidly to post 25 such that its optical axis, as extended through and displaced by reflecting glass 31, see FIG. 9, intersects and is perpendicular to the axis of pivot 19, while at the same time intersecting or coinciding with the axis of symmetry of circular track 11. The telescope is so focused that light from points in its object plane, which plane contains the axis of pivot 19, will be sharply imaged by means of objective lens 42, in the telescope image plane, on recticle 33. Carried on arm 22 is housing 27 which contains diffusing lamp 28, condensing lens 29, and target 30. Light from target 30 falls upon the reflecting surface of plane glass reflector 31 which is positioned in front of telescope 26, said reflecting surface being inclined at 45° to the axis of the telescope and perpendicular to the plane formed by the intersection of the optical axis of the telescope and the axis of pivot 19. A preferred form of target 30 comprises two straight illuminated lines crossing at right angles, one of said lines lying in said plane and parallel to the optical axis of the telescope, and the other line perpendicular to said plane (see FIGS. 5 and 6). The chief ray of target 30, extending from the crossing point of the illuminated target lines, lies in said plane, is parallel to the axis of pivot 19, and, after reflection by reflector 31, proceeds along the path of the extended and displaced optical axis of the telescope to intersect the axis 19a of pivot 19, as illustrated in FIGS. 4 and 9. This displacement has no effect upon the functioning of this invention. Hereinafter I will speak of the optical axis of the telescope, and its extended and displaced portion, as "the optical axis of the telescope." In FIG. 9 I have shown and enlarged the view of the optical axis of the telescope and its extension through reflecting glass 31, whose surfaces are plane and parallel.

Within telescope 26, in the image plane in front of the eyepiece 32, is reticle 33, containing cross lines intersecting on the optical axis of the telescope. One of the lines lies in the plane formed by the optical axis of the telescope and the axis of pivot 19, and the other line is perpendicular to said plane.

The entire assembly described rests on platform or base 34 and is capable of motion in three directions, by means of two pairs of horizontal ways and associated slides and one vertical threaded screw. One of the horizontal motions is in a direction parallel to the plane of circular arc 11 controlled by screw 35, and the other is in a direction perpendicular to the plane of circular arc 11 controlled by screw 36. The vertical motion is controlled by worm 37. The motions are accurately controlled by means of threads in the slides and driving screws for moving the slides along the ways. The motion in the plane perpendicular to circular arc 11 and controlled by screw 36 is read by means of a circular scale 38, to an accuracy of 0.01 mm.

Figure 8:
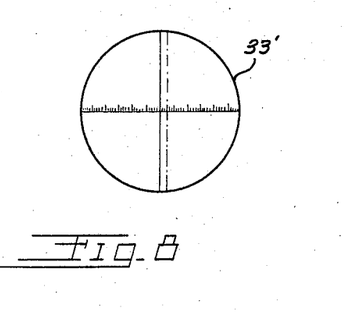

A second embodiment of the invention, not shown because it is almost identical to the first embodiment just described, has parts performing the same function as in the first embodiment, the only difference being that instead of reticle 33, which has only cross lines, I have used reticle 33', shown in FIG. 8, which also has perpendicular lines like reticle 33, but in which the cross line, perpendicular to the plane defined by the optical axis of the telescope and the axis of pivot 19, is calibrated.

Figure 7:
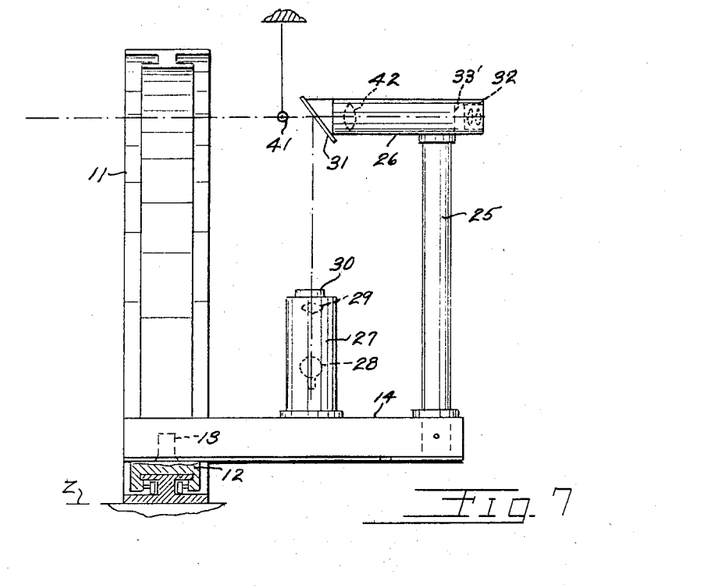
FIG. 7 is a view similar to FIG. 4 showing a third embodiment taken from the same position as FIG. 4 with all parts below the line Z being the same.

A third and preferred embodiment of the apparatus, the parts of which differing from FIG. 4 are shown in FIG. 7, is similar to the first and second embodiments, and parts performing the same function have the same reference characters. The main difference is that post 25 extends directly from arm 14 on pivot 13, there being no arm 22 or associated pivot 19, slide 18, or adjusting screw 20.

Extending from the base 34 of the apparatus is a vertical arm containing a chin and head rest 40 for the patient.

There will now be outlined in a series of steps the procedure of determining the eccentricity of the cornea with the first embodiment of this invention.

(1) The apical radius of curvature, or radii of curvature and principal directions of the patient's cornea, are first determined by keratometry in the well-known manner, in which the illuminated test object is sufficiently small that only a small apical portion of the cornea approximately 3 mm. or less in diameter is involved in the measurement.

Figure 5:
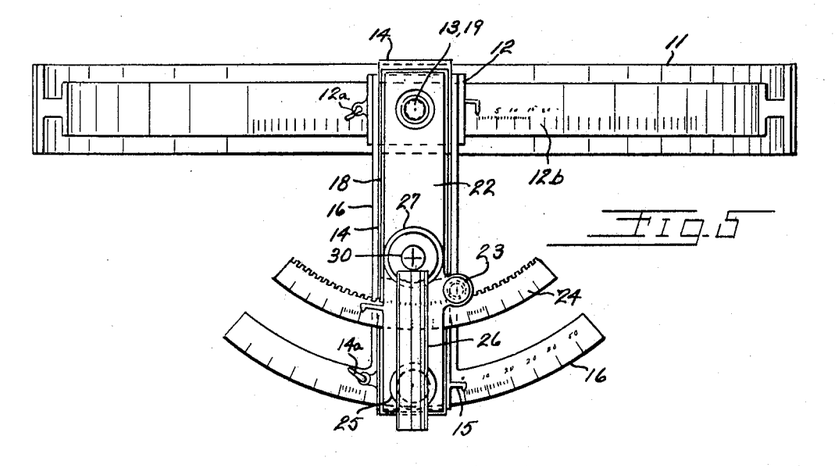
FIG. 5 is a fragmental top plan view taken along the line 5—5 of FIG. 4.

(2) Arms 14 and 22 are set parallel by adjusting screw 23. By means of threaded screw 20, slide 18 is moved relative to arm 14 until the axes of pivots 13 and 19 are coaxial. Arms 14 and 22 are then rotated to a position where they are perpendicular to the plane of circular track 11, as shown in FIG. 5. (If the corneal apex has principal directions as determined by step 1, carriage 12 is moved along circular track 11 to a position designated on scale 12b corresponding to a principal direction, and locked in position at 12a.) In the description following it will be assumed that the cornea has a non-astigmatic apex, although it is to be understood that the description can apply to each of the two principal meridians of a cornea.

(3) The patient is then seated at the eccentrometer with the head held firmly in position by head and chin rest 40, in the same manner as in keratometry. Target 30, in the form of lines crossed at right angles, with the directions as previously described, is then illuminated and the patient is asked to fixate the center of the target at the crossing point, as seen in the direction of the telescope after reflection by plane reflecting glass 31. Adjusting screws 35, 36 and 37 are then adjusted until the corneal image of target 30, as seen with the telescope, is sharply focused and the image of the cross lines is superimposed on the cross lines of the reticle of the eyepiece 32. The center of curvature of the corneal apex, the corneal apex, the crossing point of target 30 as imaged by the cornea, and the center of the reticle cross lines will all be on the optical axis of the telescope, which coincides with the axis of symmetry of circular track 11.

(4) The entire apparatus (above line Z, FIG. 4), now focused and centered on the corneal image, is advanced by screw 36, calibrated at 38, towards the cornea for a distance equal to the difference between the image position and the center of curvature of the corneal apex as determined by keratometry, i.e., for a distance $r-u'$, where $r$ is the radius of curvature of the corneal apex, and $u'$ is the image distance from the corneal apex, as determined by the mirror equation:

$$\frac{1}{u}+\frac{1}{u'}=\frac{2}{r} \qquad (6)$$

$u$ being the object distance.

The amount of advancement for a series of apical radii of curvature can be listed in tabular form so that once the apical radius of curvature is determined for a particular cornea, the amount of advancement is obtained by reference to said list. Generally the amount of advancement is some value between 3 and 4 mm. said advancement is done in order to position the axis of pivot 13 such that the optic axis of the telescope will always pass through the center of curvature of the corneal apex when the telescope is made to move in a circular arc about pivot 13.

If the effective object distance of target 30 to the cornea is relatively large, $1/u$ becomes quite small, so that the image distance is extremely close to $r/2$. The advancement of the telescope in such case is $r/2$.

(5) With the measured eye remaining fixed in position and direction of gaze by means of a supplementary fixation target 41, the telescope 26 and its supporting arms 14 and 22 are moved in a circular arc about pivot 13 for an angle $\alpha$, $\alpha$ being of the order of 20°.

(6) By means of threaded screw 20, arm 22 is moved away from the eye for a distance equal to the radius of curvature of the corneal apex. Arm 22 is then rotated about pivot 19 until the corneal image of the cross line light source is again seen superimposed on the cross lines of the telescope eyepiece. The angular rotation of arm 22 required to achieve the superimposition of the image, and read on scale 24, is $\theta$. By reference to tables or appropriate graphs calculated by Equation 3 the value of $\theta$ for the given value of $\alpha$, is sufficient to obtain the eccentricity in the principal direction of the surface measured. This is generally acceptable for cornea measurement but see discussion of greater accuracy following Equation 3 hereinabove.

When using the apparatus of the second embodiment which uses the calibrated reticle of FIG. 8, the first five steps of the procedure are the same as those for the first embodiment. Commencing with step 6, by means of theaded screw 20, arm 22 is moved away from the eye for a distance equal to the radius of curvature of the corneal apex. The examiner then observes the amount of lateral deflection of the telscope image of the crossing point of target 30 along the calibrated scale line of reticle 33', represented by the dot-dash line of FIG. 8. Said deflection is that amount of deflection of the image of the crossing point of target 30 which, in the first embodiment of this invention, is overcome by angular rotation of arm 22 about pivot 19. Hence the deflection as read on calibrated reticle 33' can be used directly to indicate the eccentricity of the cornea measured, reference being made to appropriate tables or graphs of deflection versus eccentricity said tables or graphs being those calibrated by Equation 3 as described for the first embodiment.

When using the apparatus of the third and preferred embodiment of this invention, the first three steps of the procedure are similar to those of the first embodiment, with the exception that in step 2, only arm 14 is rotated to a position where it is perpendicular to the plane of circular track 11, as shown in FIG. 5, there being no arm 22, or pivot 19, slide 18, or adjusting screw 20. Commencing with step 4, the entire apparatus, now focused and centered on the corneal image, is advanced by screw 36, calibrated at 38, towards the cornea for a distance equal to the sum of a given fraction of the radius of curvature, $r$, of the corneal apex $r/10$ for example, and the distance equal to the difference between the image position and the center of curvature of the corneal apex as determined by keratometry, i.e., for a distance $r-u'$, where $r$ is the radius of curvature of the corneal apex, and $u'$ is the image distance from the corneal apex, as determined by mirror Equation 4.

The value $r-u'$ can be listed in tabular form along with a series of associated values of $$r-u'+\frac{r}{n}$$

each series corresponding to a value of $n$, where $n$ ranges from about 20 to 3, in integer steps. Generally the amount of advancement is some value between 3 and 5 mm. Said advancement is done in order to position the arm of pivot 13 such that the optical axis of the telescope will pass through a point, $C''$, on the optical axis of the cornea, at a distance $r/n$ beyond point C, the center of curvature of the corneal apex, when the telescope is moved in a circular arc about pivot 13.

If the effective object distance of target 30 to the cornea is relatively large, $1/u$ becomes quite small so that the image distance is extremely close to $r/2$. The advancement of the telescope in such case is $r/2+r/n$.

(5) With the measured eye remaining fixed in position and direction of gaze by means of a supplementary fixation target 41, the telescope 26 and its supporting arm 14 is moved in a circular arc about pivot 13 for an angle $\gamma$, at which angle the corneal image of the cross line light source, target 30, as seen with the telescope, is again seen superimposed on the cross lines of the reticle of the eyepiece 32. Reference is then made to the appropriate table or graph, there being a series of said tables or graphs prepared each of which corresponds to a specific $n$ value, from which the eccentricity $e$ is obtained directly from the measured value of $\gamma$.

If eccentricity is so low that there is failure to obtain superimposition of the corneal image of the cross lines of target 30 on the cross lines of reticle 33, it is then necessary to repeat the procedure with a larger value of $n$.

The third embodiment of this invention is preferred since eccentricity is determined exactly with fewer procedural steps, and simplified apparatus. An additional advantage of the third embodiment is that, utilizing several values of $n$, it is possible to measure a single surface at several points along a meridian, and thereby verify whether said surface does in fact have a constant eccentricity along said meridian.

Eccentrometry for negative surfaces is performed in the same manner as for positive surfaces, with the exception that in step 4 the eccentrometer is moved *away* from the measured surface, and in step 6, for the first and second embodiments, arm 22 is moved *toward* the measured surface.

Minor changes and refinements in the apparatus and measuring technique described herein for measuring the human cornea, can be made wtihout departing from the intent of this invention. For instance, the depth of focus of the telescope may be modified by a variable aperture or graded apertures in association with the telescope objective lens, a large aperture being used to obtain critical positioning of the telescope during step 3 of the procedure, and a small aperture to provide a clear image on the reticle during step 6 in the first and second embodiments of the invention and step 5 in the third embodiment. The luminance of diffusing lamp 28 may be controlled by rheostat to insure adequate brightness of the telescope image of target 30, thereby compensating for any changes in the size of said aperture. Alternatively, the reticle and eyepiece of the telescope may be moved as a unit along the optical axis of the telescope, during step 6, in the first and second embodiments, and step 5 in the third embodiment, by a rack and pinion device, to provide sharp focusing of the image of target 30 on the reticle. The zero position of said unit would be that in which the object plane, containing the axis of pivot 19 in the first and second embodiments of the invention and the axis of pivot 13 in the third embodiment, is conjugate to the image plane of the telescope, containing reticle 33 or 33'.

The term "eccentricity" as used herein the specification and claims means the change in focal radius per unit change in vertex depth on a conicoid surface.

The term "telescope" as used herein in the specification and claims means any sighting or optical aligning device having an optical axis and capable of performing the aligning function of a telescope as recited herein.

What is claimed is:

1. Apparatus for measuring the eccentricity of a conicoid comprising a base, means for holding said conicoid in substantially fixed position relative to said base, a circular track, a carriage movable about said track, means for measuring the movement of said carriage, means for locking said carriage to said track, arm means having a pivotal mounting on said carriage for movement of said arm means in a plane normal to the plane of said track, said arm means having means for supporting a telescope at a location spaced from said pivotal mounting and with the optical axis of said telescope intersecting said pivotal axis at the axis of symmetry of said circular track and with the axis of said pivotal mounting always intersecting the optical axis of said telescope, means for projecting light from a target image toward a conicoid in alignment with the optical axis of said telescope, and means for adjusting said pivotal mounting relative to said conicoid holding means.

2. Apparatus as defined in claim 1 wherein said arm means comprises two arms, pivot means independent of said pivotal mounting connecting said arms for relative oscillation in parallel planes normal to the plane of said track, and means for causing relative adjustment between said pivot means and said pivotal mounting longitudinally of one of said arms, a telescope carried by one of said arm means at a location spaced from said pivot means with the optical axis of said telescope coinciding with the axis of symmetry of said circular track or intersecting said axis of symmetry at its point of intersection with the axis of said pivot means, and means for adjusting said arm means and telescope in angular rotation about said pivot means.

3. Apparatus as defined in claim 1 wherein said last named means includes means for shifting said circular track and said carriage horizontally in two directions at right angles to each other and also vertically.

4. Apparatus for measuring the eccentricity of conicoids including approximate conicoids, such as corneas; comprising an adjustable base means; means for holding said conicoid in substantially fixed position relative to said base means; a telescope having a pivotal mounting on said base means with the axis of said pivotal mounting being at right angles to, and lying in a common plane with, the optical axis of said telescope; said telescope or its pivotal mounting being directed axially toward said conicoid; means for measuring the angular movement of said telescope about its pivotal mounting; a reticle indicating the optical axis of said telescope; means for directing a target light beam along the optical axis of said telescope toward said conicoid; and means for moving said telescope and its pivotal mounting relative to said base means axially of said telescope toward and away from said conicoid; including means for rotating said telescope pivotal mounting while maintaining said coplanar relationship between said pivotal mounting axis and said telescope optical axis to align the axis of said mounting with a principal direction of a surface whose principal meridians are approximately conic, such as a cornea which is astigmatic at its apex.

References Cited

UNITED STATES PATENTS

| | | | |
|---|---|---|---|
| 1,750,931 | 3/1930 | Kellner et al. | 351—10 |
| 1,721,208 | 7/1929 | Currier et al. | 351—6 X |
| 1,918,540 | 7/1933 | Hartinger | 351—13 |
| 2,478,609 | 8/1949 | Townsley. | |
| 2,482,669 | 9/1949 | Harding. | |
| 2,999,422 | 9/1961 | Papritz | 351—16 X |

DAVID SCHONBERG, Primary Examiner

PAUL A. SACHER, Assistant Examiner

U.S. Cl. X.R.

351—13, 16